United States Patent
Fan et al.

(10) Patent No.: US 6,893,763 B2
(45) Date of Patent: May 17, 2005

(54) COMPOSITE POLYMER ELECTROLYTE MEMBRANE FOR POLYMER ELECTROLYTE MEMBRANE FUEL CELLS

(75) Inventors: Qinbai Fan, Chicago, IL (US); Siem Le, Streamwood, IL (US)

(73) Assignee: Gas Technology Institute, Des Plaines, IL (US)

( * ) Notice: Subject to any disclaimer, the term of this patent is extended or adjusted under 35 U.S.C. 154(b) by 395 days.

(21) Appl. No.: 10/139,971

(22) Filed: May 6, 2002

(65) Prior Publication Data

US 2003/0194593 A1 Oct. 16, 2003

Related U.S. Application Data

(60) Provisional application No. 60/373,057, filed on Apr. 16, 2002.

(51) Int. Cl.[7] ................................................ H01M 8/10
(52) U.S. Cl. .......................................... 429/33; 429/30
(58) Field of Search ..................... 429/30, 33; 252/62.2

(56) References Cited

U.S. PATENT DOCUMENTS

| | | | |
|---|---|---|---|
| 3,720,321 A | * | 3/1973 | Coughlin et al. ............ 210/650 |
| 4,272,560 A | | 6/1981 | Baczek et al. |
| 5,188,766 A | * | 2/1993 | Eiffler ......................... 252/500 |
| 5,211,827 A | * | 5/1993 | Peck ............................ 204/252 |
| 5,350,643 A | * | 9/1994 | Imahashi et al. ............... 429/33 |
| 5,409,785 A | | 4/1995 | Nakano et al. |
| 5,468,574 A | | 11/1995 | Ehrenberg et al. |
| 5,518,838 A | * | 5/1996 | Bai et al. ....................... 429/310 |
| 5,679,482 A | | 10/1997 | Ehrenberg et al. |
| 6,110,616 A | | 8/2000 | Sheikh-Ali et al. |
| 6,383,391 B1 | | 5/2002 | Ehrenberg et al. |
| 6,413,298 B1 | | 7/2002 | Wnek et al. |
| 6,630,265 B1 | * | 10/2003 | Taft et al. ...................... 429/33 |

FOREIGN PATENT DOCUMENTS

| | | |
|---|---|---|
| EP | 0 274 387 A2 | 7/1988 |
| WO | WO 00/28611 | 5/2000 |
| WO | WO 01/63683 | 8/2001 |

* cited by examiner

*Primary Examiner*—Mark Ruthkosky
(74) *Attorney, Agent, or Firm*—Mark E. Fejer

(57) ABSTRACT

A polymer electrolyte membrane for a polymer electrolyte membrane fuel cell, which polymer electrolyte membrane has a water-based resin preferably including at least one of vinyl acetate, dextrin and latex.

15 Claims, 6 Drawing Sheets

COMPOSITE POLYMER ELECTROLYTE MEMBRANE FOR POLYMER ELECTROLYTE MEMBRANE FUEL CELLS

CROSS-REFERENCE TO RELATED APPLICATION

This application claims the benefit of an earlier filed provisional application having Ser. No. 60/373,057 and a Filing Date of Apr. 16, 2002.

BACKGROUND OF THE INVENTION

1. Field of the Invention

This invention relates to a composite polymer electrolyte membrane for polymer electrolyte membrane fuel cells. More particularly, this invention relates to a composite polymer electrolyte membrane which is able to operate at fuel cell operating temperatures of 60° C. and 150° C. and temperatures therebetween.

2. Description of Related Art

A fuel cell is an electrochemical device in which a fuel, such as hydrogen, is converted into electricity. The components of a fuel cell include an anode electrode, a cathode electrode and an electrolyte disposed therebetween. In a polymer electrolyte membrane fuel cell, the electrolyte is an ionically conductive membrane. For polymer electrolyte membrane fuel cells (PEMFC), the ionically conductive membrane should provide high ionic conductance with high strength, low electric conductance and chemical/electrochemical/thermal stability under fuel cell operating conditions. In conventional polymer electrolyte membrane fuel cells, the polymer electrolyte membrane is made of one or more fluorinated polymers, such as NAFION®, a fluorinated polymer membrane, and GORE-SELECT® membrane, a mixture of a per-fluorinated polymer and fluorinated ion exchange resin. However, the fluorinated polymer material is very expensive, as a result of which commercialization of the polymer electrolyte membrane fuel cell has been forestalled.

The requirements for a polymer electrolyte membrane in a polymer electrolyte membrane fuel cell include: (1) high proton conductivity at low relative humidity; (2) long life, that is long-term chemical/electrochemical/thermal stability, (3) low cost, and (4) low gas permeability. In order to meet these requirements, a stable polymer is necessary as a backbone; for example, NAFION uses a TEFLON® backbone structure.

Many proton conductive membranes are known in the art. These membranes are classified as follows:

1. Inorganic Membranes

The inorganic membranes known to be used in conventional polymer electrolyte membrane fuel cells are heteropolyacid, such as phosphotungstic acid ($H_3PO_4 \cdot 12WO_3 \cdot xH_2O$), phosphomolybdic acid ($H_3PO_4 \cdot 12Mo_0O_3 \cdot xH_2O$), and silicotungtic acid ($SiO_2 \cdot 12WO_3 \cdot xH_2O$) and sol-gels, such as silica, titania, alumina, and zeolite. However, problems with the inorganic membranes in polymer electrolyte membrane fuel cells include very low conductivity and brittleness of the membrane. To date, to the best of our knowledge, no polymer electrolyte membrane fuel cell performance data for polymer electrolyte membrane fuel cells employing inorganic membranes have been reported.

2. Organic Polymer Membranes

Organic polymer membranes at present dominate polymer electrolyte membrane fuel cell development. At low operating temperatures, NAFION (DuPont), GORE-SELECT reinforced membranes (W. L. Gore), ACIPLEX® (Asahi Chemicals), FLEMION® (Asahi Glass), and BAM® (Ballard Power) are used. These membranes are limited to cell operation temperatures less than 100° C. with well humidified gas feeds and their manufactured costs are high. In contrast thereto, high temperature membranes focus on the use of sulfonated/phosphonated polymers, such as $H_3PO_4$ doped polybenzimidazole (PBI) or polyoxadiazoles. However, the stability of these high temperature membranes is low and the cost of the membrane is also high.

3. Composite Membrane

The composite membranes include inorganic-organic composite membranes and organic-organic membranes. The inorganic-organic membranes contain organic binders with inorganic acids, such as Zr-Phosphate+PTFE and Silicophosphate Gel Glass Composite; Sol-Gel Silane+PEO+$HClO_4$; Silicophosphate Gel Composite+Porous Alumina Support+$HClO_4$ etc. The organic-organic polymer membrane contains two or more organic polymers, such as PPSU (Polyphenyl sulfone)+PBO (Polybisbenzoxazole-1,4-phenylene) etc. However, to the best of our knowledge, no promising performance and lifetime data of polymer electrolyte membrane fuel cells with these membranes is known.

SUMMARY OF THE INVENTION

Accordingly, it is one object of this invention to provide a polymer electrolyte membrane having high proton conductivity at low relative humidity.

It is another object of this invention to provide a polymer electrolyte membrane fuel cell having long-term chemical, electrochemical and thermal stability.

It is a further object of this invention to provide a polymer electrolyte membrane that is lower in cost than conventional polymer electrolyte membranes.

It is a further object of this invention to provide a polymer electrolyte membrane having low gas permeability.

It is yet a further object of this invention to provide a polymer electrolyte membrane which is capable of operating at fuel cell operating temperatures of 60° C. and 150° C., as well as at temperatures therebetween.

It is still a further object of this invention to provide a polymer electrolyte membrane fuel cell having the properties set forth hereinabove.

These and other objects of this invention are addressed by a series of new composite membranes that are composed mainly of a water-based resin including, but not limited to, vinyl acetate, dextrin and latex. In accordance with various embodiments of this invention, acidic materials are mixed with the water-based resin, thus embedding the acidic materials in the final membrane structure. The fuel cell fabricated from this disclosed membrane can operate both under high temperature and low temperature by varying the different acid doping materials. In accordance with one embodiment of this invention, a wetting agent is added to the high temperature membrane to hold water to increase proton conductivity. Suitable wetting agents include silica and titanium oxide.

BRIEF DESCRIPTION OF THE DRAWINGS

These and other objects and features of this invention will be better understood from the following detailed description taken in conjunction with the drawings wherein.

DETAILED DESCRIPTION OF PREFERRED EMBODIMENTS

Definitions

Figure 1:
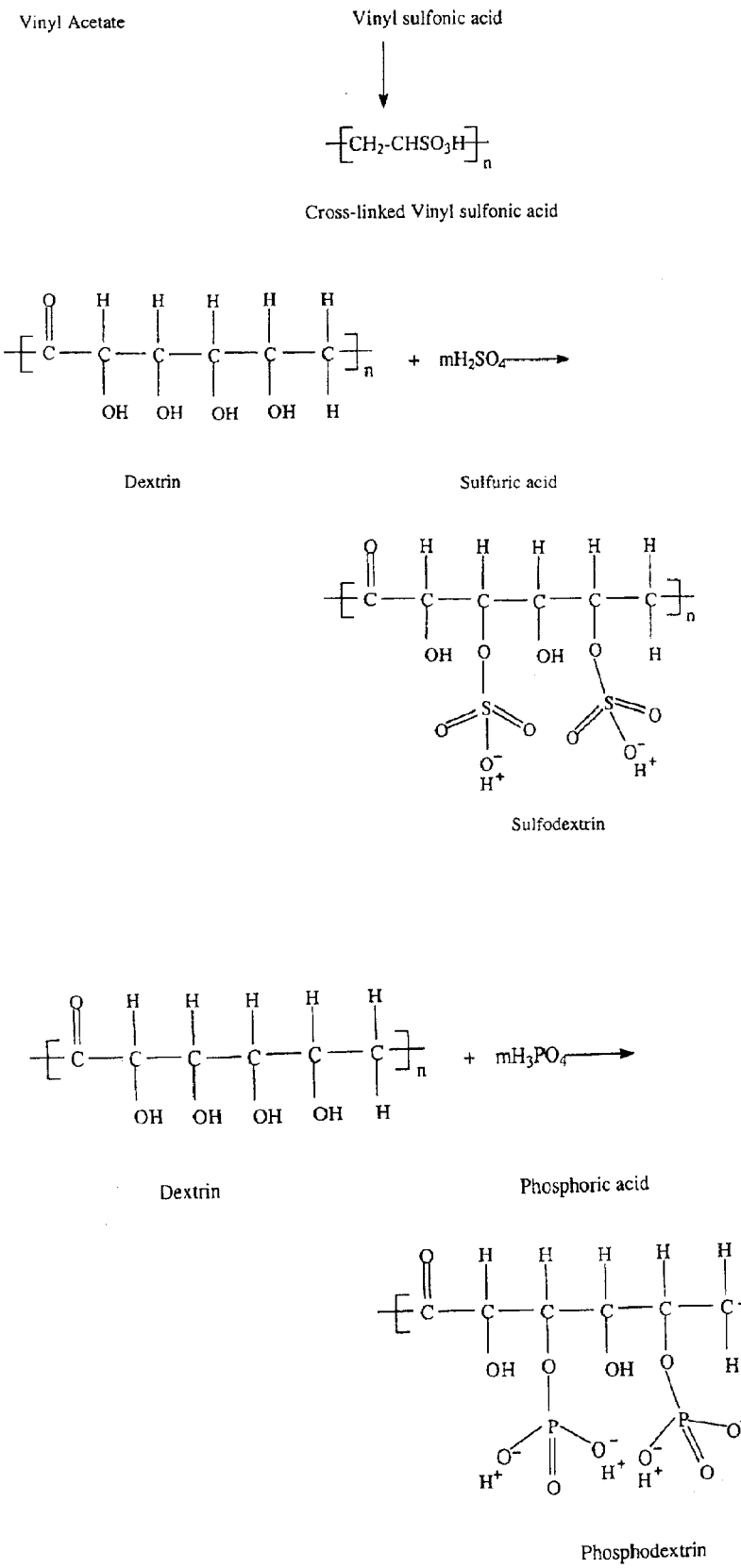
FIG. 1 is a diagram showing the reaction of dextrin with sulfuric acid and phosphoric acid to form sulfodextrin and phosphodextrin in accordance with two embodiments of this invention.

As used herein, the term "water-based", when used to describe a material, e.g. water-based resin, refers to a material that, prior to forming into a membrane as disclosed herein, is soluble in water or is dissolved as an emulsion and subsequent to forming the membrane is not soluble in water. Thus, the water-based resin referred to herein, prior to being formed into a membrane, can be dissolved in water. However, once the water-based resin has been cured, for example by heating or otherwise processed to form the membrane, it can no longer be dissolved in water.

As used herein, the term "membrane" refers to a substantially nonporous, pliable material having a thickness in the range of about 1 to about 10 mils.

In order to meet the aforementioned requirements for viable polymer electrolyte membrane fuel cell commercialization, the polymer electrolyte membrane requires a stable polymer as a backbone (e.g. NAFION uses a TEFLON backbone structure). We have identified water-based resins suitable for use as a backbone that are naturally available and environmental friendly materials. Doping the water-based resins with different acidic materials produces a composite membrane. In addition, we have discovered that different acidic material doping produces different composite membranes, which are suitable for operation at both low temperatures, about 60° C., and high temperatures, about 150° C., as well as temperatures between 60° C. and 150° C. On a laboratory scale, the water-based resin costs only about $1.70/lb and the doping materials cost in the range of $2 to $6/lb of resin. This is compared to a cost of $2,500/lb of NAFION on a laboratory scale or other materials employed to produce conventional polymer electrolyte membranes.

The composite membranes were fabricated into fuel cells and tested for performance and endurance. The single cell test results showed that the water-based resin was very stable under fuel cell operating conditions up to 500 hours and no leachant of doping material was found in the condensed water from either the anode electrode or the cathode electrode.

Composite polymer electrolyte membranes in accordance with this invention are produced by diluting a water-based resin with water to form a water-based resin solution. The solution is then mixed with at least one acidic doping material, forming a doped resin solution, which is then formed into a membrane.

In accordance with one exemplary embodiment of this invention, a water-based resin comprising vinyl acetate, dextrin or latex (R92120), available from Capital Adhesives, Mooresville, Ind.), was diluted with water. In accordance with one preferred embodiment of this invention, the amount of water utilized comprises in the range of about 60% to about 90% by weight of the resulting solution. The dextrin in the water-based resin is one of the main active materials to form the membrane. Dextrin is one of a number of carbohydrates having the same general formula as starch; but it is a smaller and less complex molecule. These carbohydrates are polysaccharides and are produced as intermediate products in the hydrolysis of starch by heat, by acids, and by enzymes. Their nature and their chemical behavior depend to a great extent on the kind of starch from which they are derived. The solution was then mixed with acidic doping materials. Suitable acidic doping materials include NAFION, polymethyl vinyl ether maleic acid, poly(acrylic acid—CO—maleic acid), phosphoric acid, sulfuric acid, hydroxybenzenesulfonic acid, and other polyacids. The amount of water in the solution is variable depending upon the thickness requirements of the membranes. As the amount of water is increased, the thickness of the resulting membrane is reduced. In accordance with one embodiment of this invention, the water-based resin comprises vinyl acetate, which is a cross-link material to make the membrane stronger and more stable.

Dextrin serves two primary functions in the polymer electrolyte membrane. It reacts with the doping materials to form the membrane and it embeds the doping materials in the membrane due to its adhesive properties. FIG. 1 shows the reaction of vinyl acetate and dextrin with sulfuric acid and phosphoric acid to form cross-linked vinyl acid, sulfo-dextrin and phosphodextrin in accordance with certain preferred embodiments of this invention. In accordance with one preferred embodiment of this invention, the water-based resin comprises polymethyl vinyl ether maleic acid, hydroxybenzenesulfonic acid and/or silica in addition to phosphoric acid or sulfuric acid.

The mixture of the water-based resin with doping acid and other material is cast to form a membrane. In accordance with one preferred embodiment of this invention, the amount of water-based resin in the membrane is in the range of about 20% to about 60% by weight and the doping acid comprises in the range of about 30% to about 60% by weight of the membrane. No significant difference in the appearance of the membranes was found to exist between the membrane with phosphoric acid doping and the membrane with sulfuric acid doping.

The membranes were treated in a nitrogen-purged oven at 140° C. in those instances in which phosphoric acid doping was employed and at 80° C. in those instances in which sulfuric acid doping was employed. Without nitrogen purging, the membranes become black due to the oxidation of the dextrin by oxygen from the air rather than the acid-doping reaction.

Figure 2:
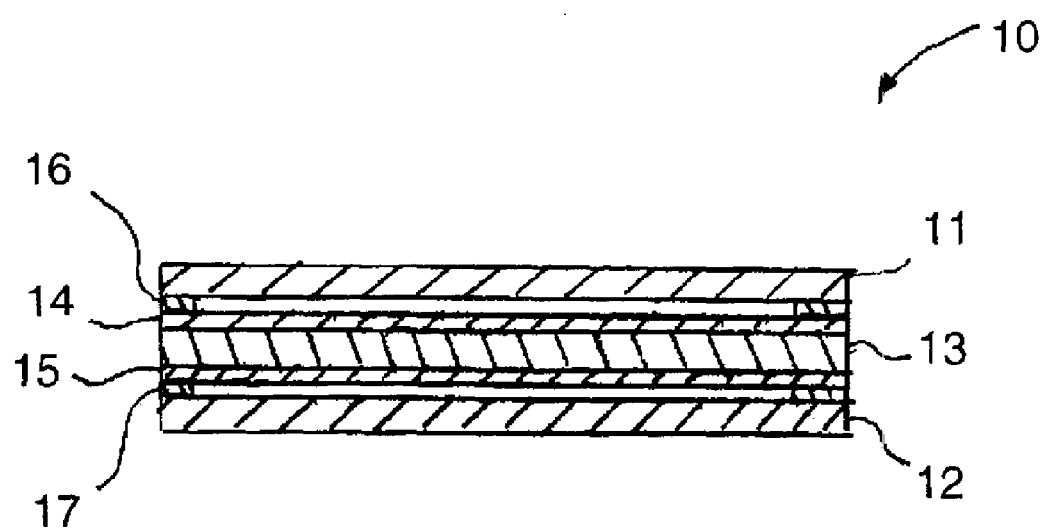
FIG. 2 is a diagram showing a cross-sectional view of a membrane electrode assembly with a membrane and gas diffusion electrodes in accordance with one embodiment of this invention.

Catalyst ink containing Pt—C catalyst from Johnson-Matthey with the ionomer of the doping material was prepared and directly applied to a membrane produced as discussed hereinabove. Two gas diffusion layers with two layers of sub-gaskets were placed on the catalyst layers. Because the catalyst ink is directly deposited on the membrane, no hot press step is necessary to fabricate the membrane electrode assembly (MEA). FIG. 2 is a diagram of an MEA 10 comprising an anode electrode 11, a cathode electrode 12 and a polymer electrolyte membrane 13 disposed therebetween. Also shown are the catalyst layers 14, 15 and the sub-gaskets 16, 17. This MEA was assembled into a 60° C. single cell with two graphite bipolar plates for a test.

Figure 3:
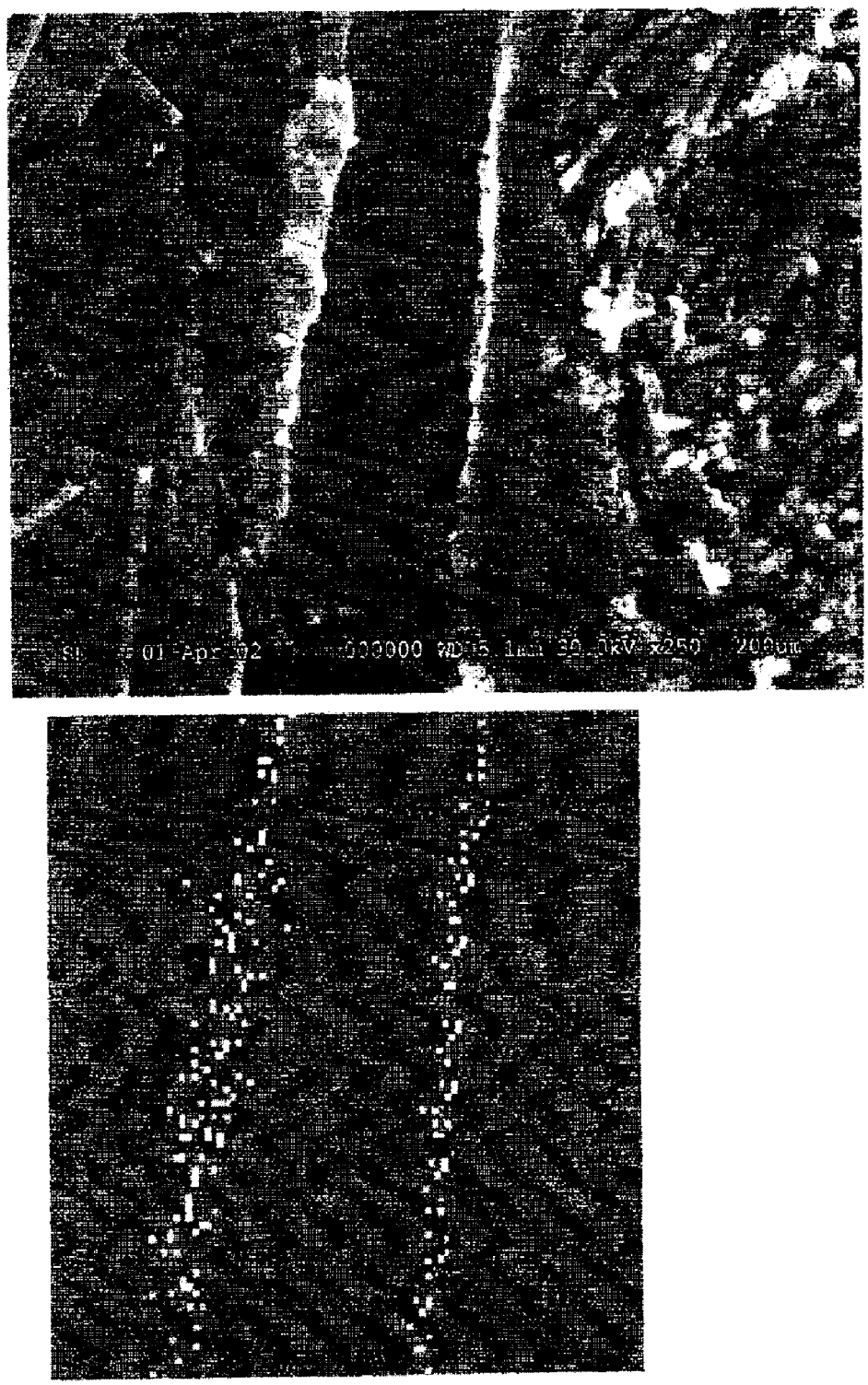
FIG. 3 is a diagram showing the cross-imagine of a membrane electrode assembly and the mapping of Pt catalyst distribution in accordance with one embodiment of this invention.

The membrane electrode assembly was analyzed by a scanning electron microscopy (SEM). FIG. 3 shows the cross-imagine of the MEA and the mapping of the Pt catalyst distribution. The membrane thickness was measured to be approximately 5 mils.

EXAMPLE 1

Figure 4:
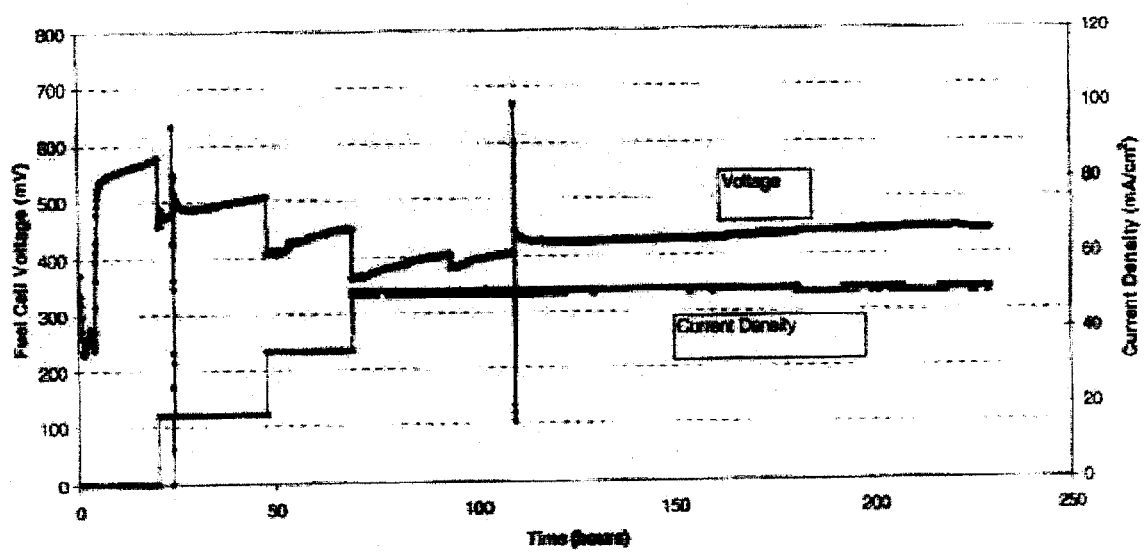
FIG. 4 is a diagram showing the results of a lifetime test of a polymer electrolyte membrane fuel cell with a composite membrane in accordance with one embodiment of this invention containing a water-based polymer (80%) with NAFION (20%)

In this example, to examine the stability of the water-based resin of this invention under fuel cell operating conditions, the water-based resin was first mixed with a NAFION emulsion to form a membrane. FIG. 4 shows the results of a lifetime test of a polymer electrolyte membrane fuel cell with a composite membrane in accordance with one embodiment of this invention comprising the water-based resin (80% by weight) and NAFION emulsion (20% by weight). The performance of the cell, as is shown, is very stable although the cell performance is low due to low NAFION doping. The thickness of the membrane was approximately 5 mils. NAFION was used in this example as an expedient to form a membrane for initial testing of the stability of the water-based resin. However, it is not needed in the membrane manufacturing.

EXAMPLE 2

Figure 5:
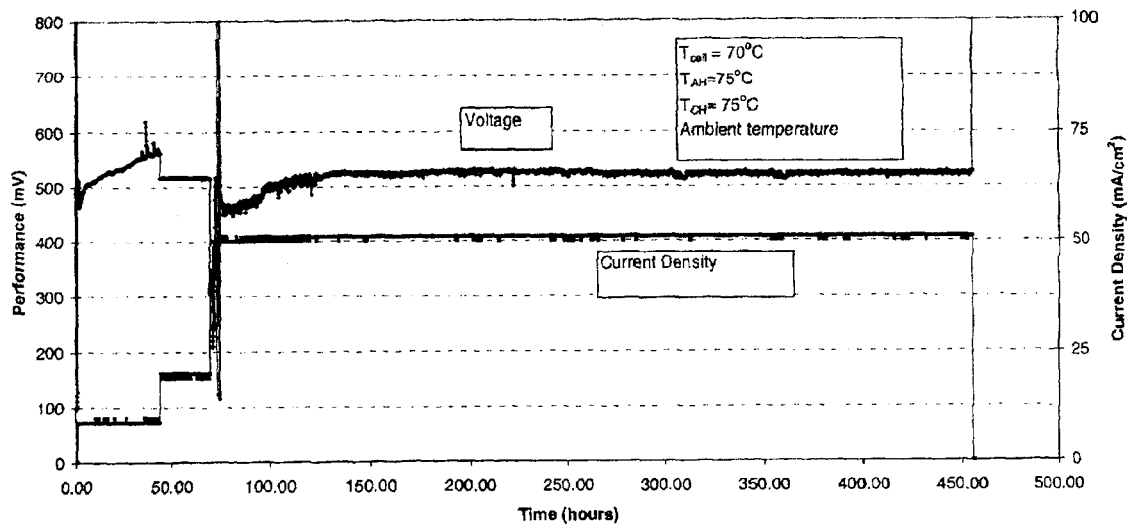
FIG. 5 is a diagram showing the results of operation of a polymer electrolyte membrane fuel cell with a low temperature polymer electrolyte membrane in accordance with one embodiment of this invention.

In this example, the water-based resin (34% by weight) was mixed with polymethyl vinyl ether maleic acid (33% by weight) and sulfuric acid (33 % by weight) to produce a membrane. The thickness of the membrane was approximately 5 mils. The strength of the membrane was found to increase after the addition of the 33% by weight sulfuric acid. However, it should be noted that too much sulfuric acid weakens the membrane. FIG. 5 shows the results of a lifetime test of the membrane.

EXAMPLE 3

Figure 6:
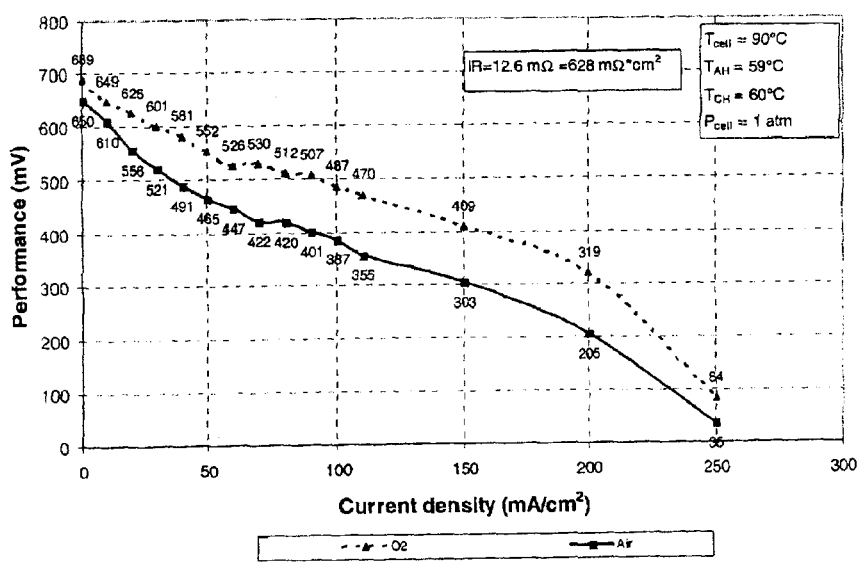
FIG. 6 is a diagram showing the polarization curves of a polymer electrolyte membrane fuel cell with a composite polymer electrolyte membrane comprising silica and phosphoric acid in accordance with one embodiment of this invention.

In this example, the water-based resin (40% by weight) was mixed with $SiO_2$ (15% by weight) and phosphoric acid (45% by weight) to produce a membrane. The thickness of the membrane was approximately 5 mils. The silica in the membrane acts as a wetting agent for holding water so as to promote proton conductivity. In accordance with one preferred embodiment of this invention, the amount of silica utilized in the membrane is in the range of about 10% to about 40% by weight of the membrane. FIG. 6 displays the performance curves of a fuel cell with the membrane. Although the performance is low, modification of the catalyst layer, reductions in the thickness of the membrane, and increasing acid doping can be expected to improve performance.

Figure 7:
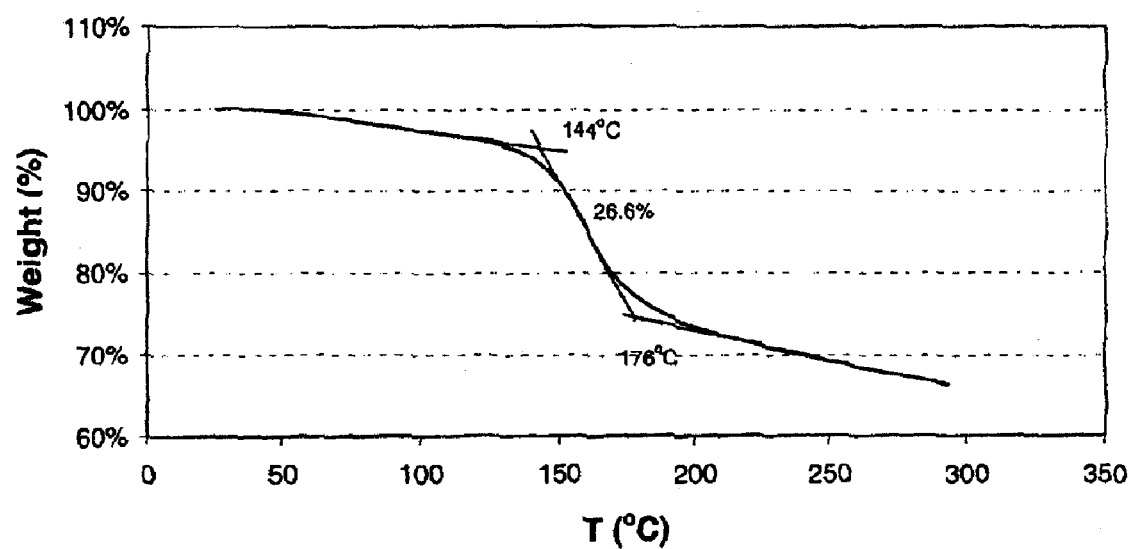
FIG. 7 is a diagram showing thermal gravity analysis data for a high temperature polymer electrolyte membrane in accordance with one embodiment of this invention.

FIG. 7 shows the results of a thermal gravity analysis (TGA) on a membrane in accordance with this invention. The results indicate that the membrane can be operated at greater than 140° C. The boiling point of the phosphoric acid is 158° C. The loss of weight shown in FIG. 7 is mainly attributable to the loss of free phosphoric acid in the membrane.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. In a polymer electrolyte membrane fuel cell comprising an anode electrode, a cathode electrode and a polymer electrolyte membrane disposed between said anode electrode and said cathode electrode, the improvement comprising:

said polymer electrolyte membrane comprising a water-based resin backbone, said water-based resin comprising at least one of dextrin and latex.

2. A polymer electrolyte membrane fuel cell in accordance with claim 1, wherein said polymer electrolyte membrane further comprises at least one acidic material.

3. A polymer electrolyte membrane fuel cell in accordance with claim 2, wherein said at least one acidic material is selected from the group consisting of perfluorosulfonate, polymethyl vinyl ether maleic acid, poly(acrylic acid-CO-maleic acid), phosphoric acid, sulfuric acid, hydroxybenzenesulfonic acid and mixtures thereof.

4. A polymer electrolyte membrane fuel cell in accordance with claim 2, wherein said at least one acidic material is a polyacid.

5. A polymer electrolyte membrane fuel cell in accordance with claim 2, wherein said polymer electrolyte membrane further comprises silica.

6. A polymer electrolyte membrane fuel cell in accordance with claim 1, wherein said water-based resin is doped with at least one acidic material.

7. A polymer electrolyte membrane fuel cell in accordance with claim 6, wherein said at least one acidic material is selected from the group consisting of polymethyl vinyl ether maleic acid, poly(acrylic acid-CO-maleic acid), phosphoric acid, sulfuric acid, hydroxybenzenesulfonic acid and mixtures thereof.

8. A polymer electrolyte membrane fuel cell in accordance with claim 7, wherein said water-based resin is doped with silica.

9. A polymer electrolyte membrane fuel cell in accordance with claim 1, wherein said anode electrode, said cathode electrode and said polymer electrolyte membrane form a membrane electrode assembly.

10. A polymer electrolyte membrane fuel cell in accordance with claim 9, wherein said anode electrode and said cathode electrode are in a form of gas diffusion layers.

11. A polymer electrolyte membrane fuel cell in accordance with claim 1, wherein said polymer electrolyte membrane is suitable for use at a fuel cell operating temperature of 60° C. and 150° C. and temperatures therebetween.

12. A polymer electrolyte membrane fuel cell in accordance with claim 1, wherein said water-based resin further comprises vinyl acetate.

13. A material suitable for use as an electrolyte in a polymer electrolyte membrane fuel cell comprising:

a water-based resin backbone doped with at least one acidic material and formed into a polymer electrolyte membrane, said water-based resin comprising at least one of dextrin and latex.

14. A material in accordance with claim 13, wherein said at least one acidic material is selected from the group consisting of perfluorosulfonate, polymethyl vinyl ether maleic acid, phosphoric acid, sulfuric acid, hydroxybenzenesulfonic acid and mixtures thereof.

15. A membrane material in accordance with claim 13 further comprising silica.

* * * * *